Dec. 15, 1931.  B. H. REEVES  1,836,771
MACHINE FOR MAKING INSULATED WIRE
Original Filed Jan. 19, 1927  4 Sheets-Sheet 1

Dec. 15, 1931.  B. H. REEVES  1,836,771
MACHINE FOR MAKING INSULATED WIRE
Original Filed Jan. 19, 1927  4 Sheets-Sheet 2

Inventor
Beauford H. Reeves

By Rockwell & Bartholo
Attorney

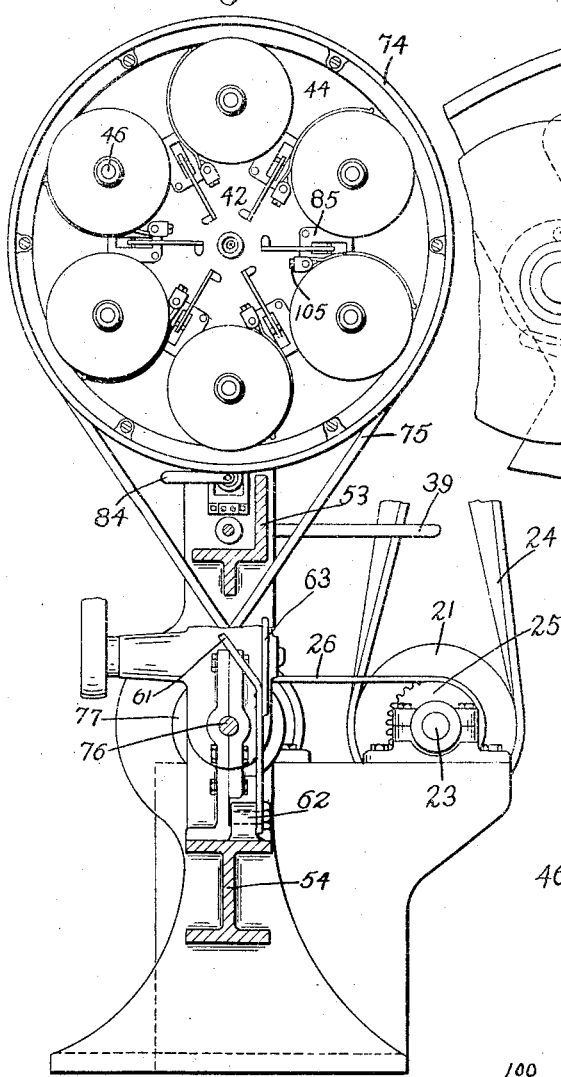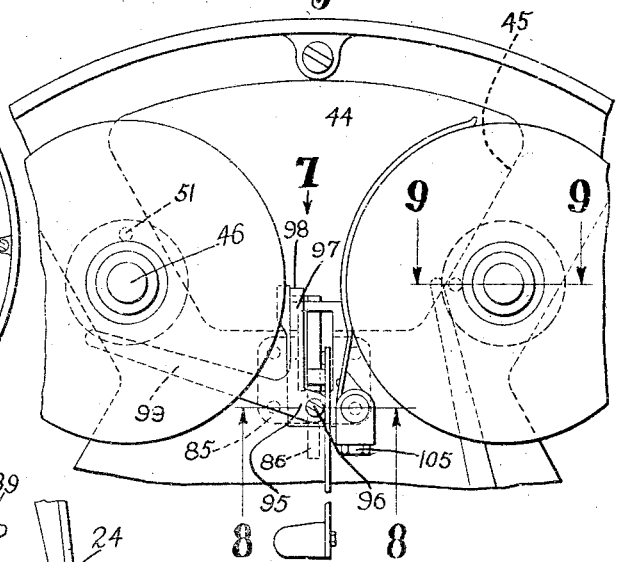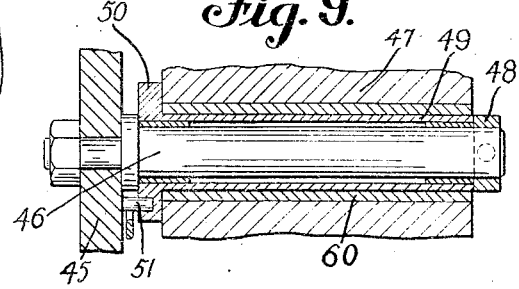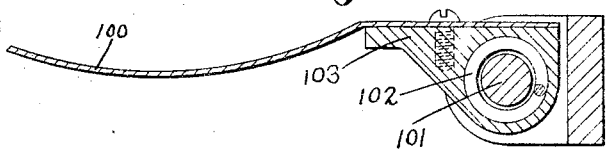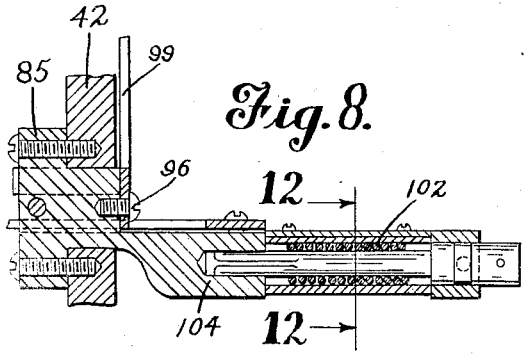

Dec. 15, 1931.  B. H. REEVES  1,836,771
MACHINE FOR MAKING INSULATED WIRE
Original Filed Jan. 19, 1927    4 Sheets-Sheet 4
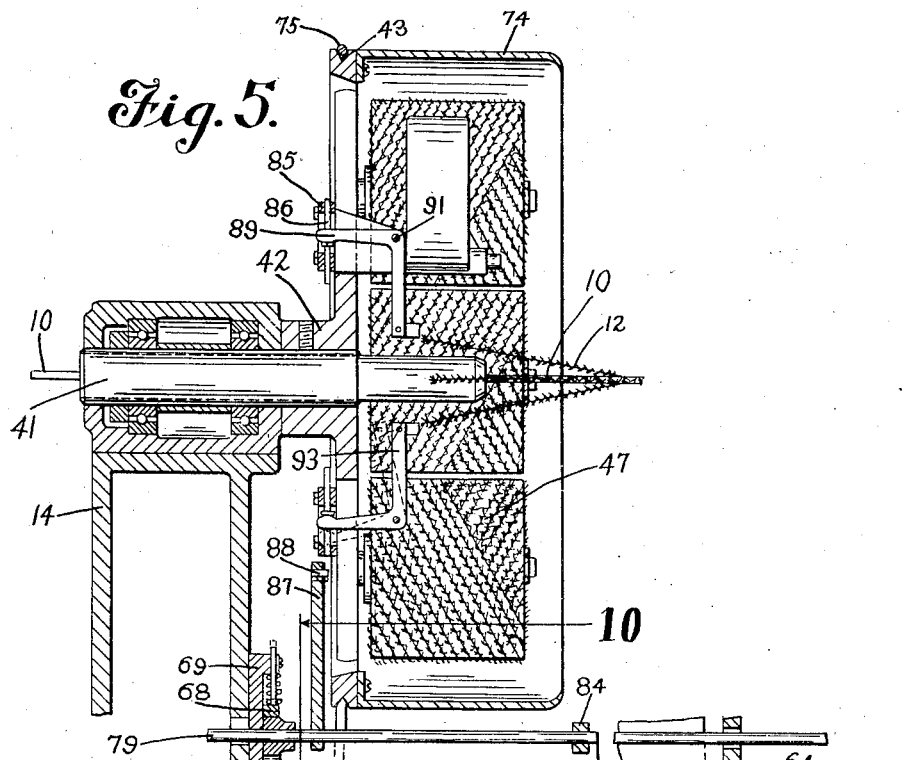
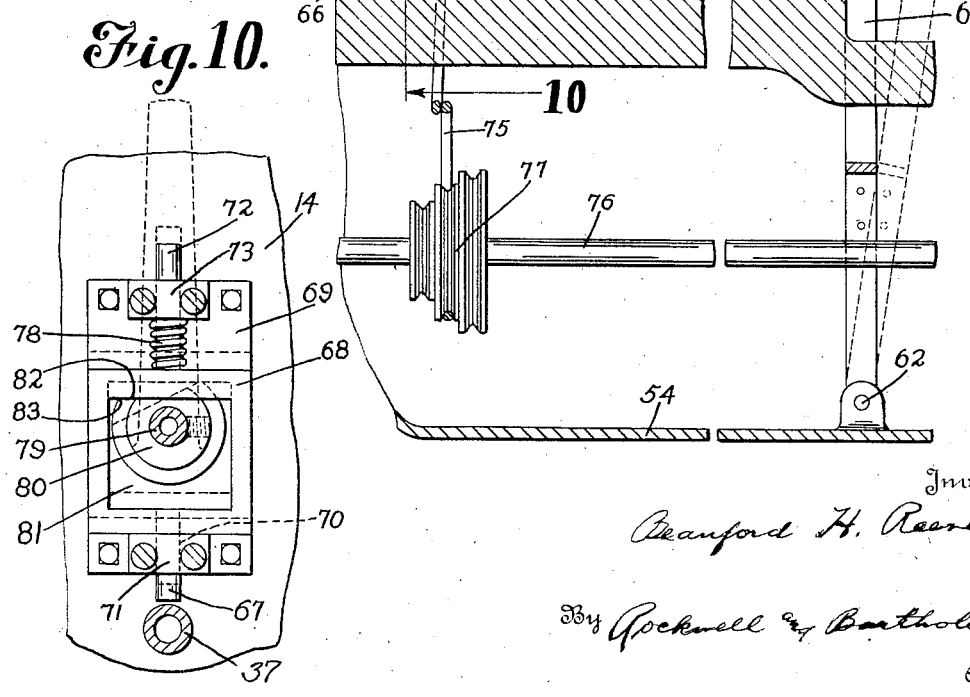

Patented Dec. 15, 1931

1,836,771

UNITED STATES PATENT OFFICE

BEAUFORD H. REEVES, OF NEW HAVEN, CONNECTICUT, ASSIGNOR TO ROCKBESTOS PRODUCTS CORPORATION, OF NEW HAVEN, CONNECTICUT

MACHINE FOR MAKING INSULATED WIRE

Original application filed January 19, 1927, Serial No. 162,169. Divided and this application filed November 11, 1927. Serial No. 232,689.

This invention relates to machines for making insulating coverings for electrical conductors or the like. More especially, this invention relates to an improved mechanism for controlling machines of the type shown and described in Patent No. 1,789,882, issued Jan. 20, 1931, of which this application is a division. Such machines are adapted to form an insulating covering in such a manner that the same will be substantially a one-piece structure, regardless of the length of the wire, and that the covering will be of substantially uniform thickness about the conductor.

The insulating machines generally in use prior to this invention, covered a conductor with insulating material of various kinds by winding, braiding, and other similar operations. These operations were generally time consuming inasmuch as in many instances more than one layer of material was required to properly insulate the conductor, and each layer required a separate machine to apply the same. The design of the machines used, was such that only a limited length of conductor could be covered at one adjustment thereof, after which the conductor was severed, the machine readjusted and the conductor ends rejoined. Insulating coverings made by previous machines wherein the strands of the covering were helically wound upon the conductor, had the disadvantage of a tendency for the strands to separate when the covered conductor was sharply bent, which destroyed the insulating qualities thereof.

One object of this invention is to provide an improved machine for use in covering a conductor or the like, with an insulating material which preferably comprises a loose, untwisted roving or rovings of thread reinforced fibres, and wherein these rovings are wound upon the conductor in a novel manner, and then bound together with a binding compound, compressed, and smoothed into a dense mass of intermingled fibres, thereby forming a substantially one-piece structure.

Another object of this invention is to provide in a machine for winding strands of insulating material upon the core member, improved stop mechanism for arresting the action of the machine, which is automatically operated by an interruption in the strand of insulating material.

Still another object of this invention is to provide in a machine wherein a plurality of cheeses or the like of roving are rotated about a conductor or core member to wind the roving thereupon, improved means under the control of the rovings to interrupt the rotation of the cheeses about the core member.

Still another object of this invention is to provide an improved automatic stop mechanism for a machine of the character mentioned, which is simple and efficient.

A further object of this invention is to provide an improved stop mechanism for an insulated wire making machine which may be readily adjusted to suit the requirements of the product of such a machine.

A still further object of this invention is to provide an improved stop mechanism for an insulated wire making machine wherein a plurality of cops of insulating material in strand form is used, which will efficiently operate under control of the strand material to stop the machine and which is adapted to be readily set in an inoperative position and automatically placed in an operative position to suit the requirements of the product of the machine.

To these and other ends, the invention consists in the novel features and combinations of parts to be hereinafter described and claimed.

In the accompanying drawings:

Fig. 3 is a section on line 3—3 of Fig. 1;

Fig. 5 is a section on line 5—5 of Fig. 4;

Fig. 6 is an enlarged end face view of a portion of the cop or cheese holder;

Fig. 7 is a view of the roving engaging means and of the associated parts thereof, looking in the direction of arrow 7 of Fig. 6;

Fig. 8 is a section on line 8—8 of Fig. 6;

Figure 4:
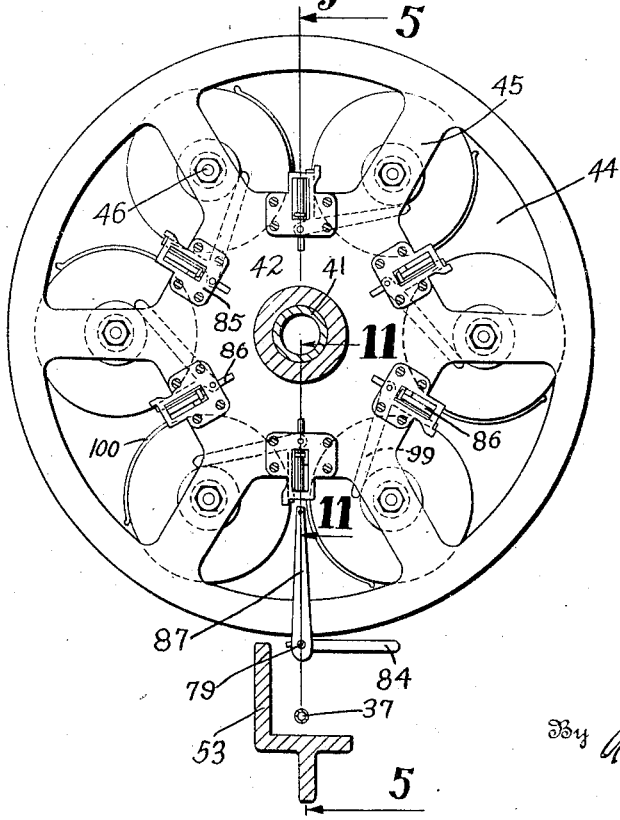
Fig. 4 is a section on line 4—4 of Fig. 1.
Figure 11:
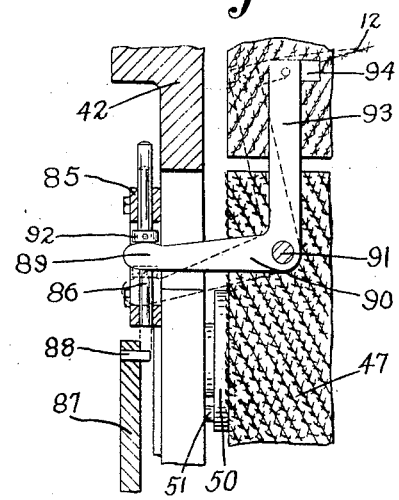

Fig. 9 is a section on line 9—9 of Fig. 6;
Fig. 10 is a section on line 10—10 of Fig. 5;
Fig. 11 is a section on line 11—11 of Fig. 4, and
Fig. 12 is a section on line 12—12 of Fig. 8.

The machine selected to illustrate the features of this invention, is adapted to apply a layer of insulating material having the above mentioned characteristics upon the surface of the conductor or core member, by the method described in my copending application, Serial No. 130,550, filed August 20, 1926, and is generally of the same structure as that described in Patent No. 1,789,882, issued Jan. 20, 1931. For the purpose of illustrating the features of this application, certain features disclosed in the latter application above referred to, have been omitted, as the same were not specifically pertinent to this invention. For instance, only one machine section which includes a rotary winding head, a compound applicator, and a compressing and polishing device, with the driving mechanisms therefor where required, is illustrated, together with a power driven conductor feeding means and a conductor straightening device.

According to the methods described in the above noted applications, a conductor 10 is fed to the machine passing first through a straightening device wherein kinks, bends, etc., are taken out of the same and then fed through a rotary winding head, which winds strands of insulating material upon the conductor from a plurality of cops secured thereto, while the conductor is being fed along from one end of the machine to the other by suitable mechanism. The covered conductor is then fed respectively to a binding compound applicator and a compressing and polishing device. These operations are needed in order to apply a single layer of insulating material upon a conductor. In addition to the structure noted above, some form of driving mechanism and controls therefor are required.

Figure 1:
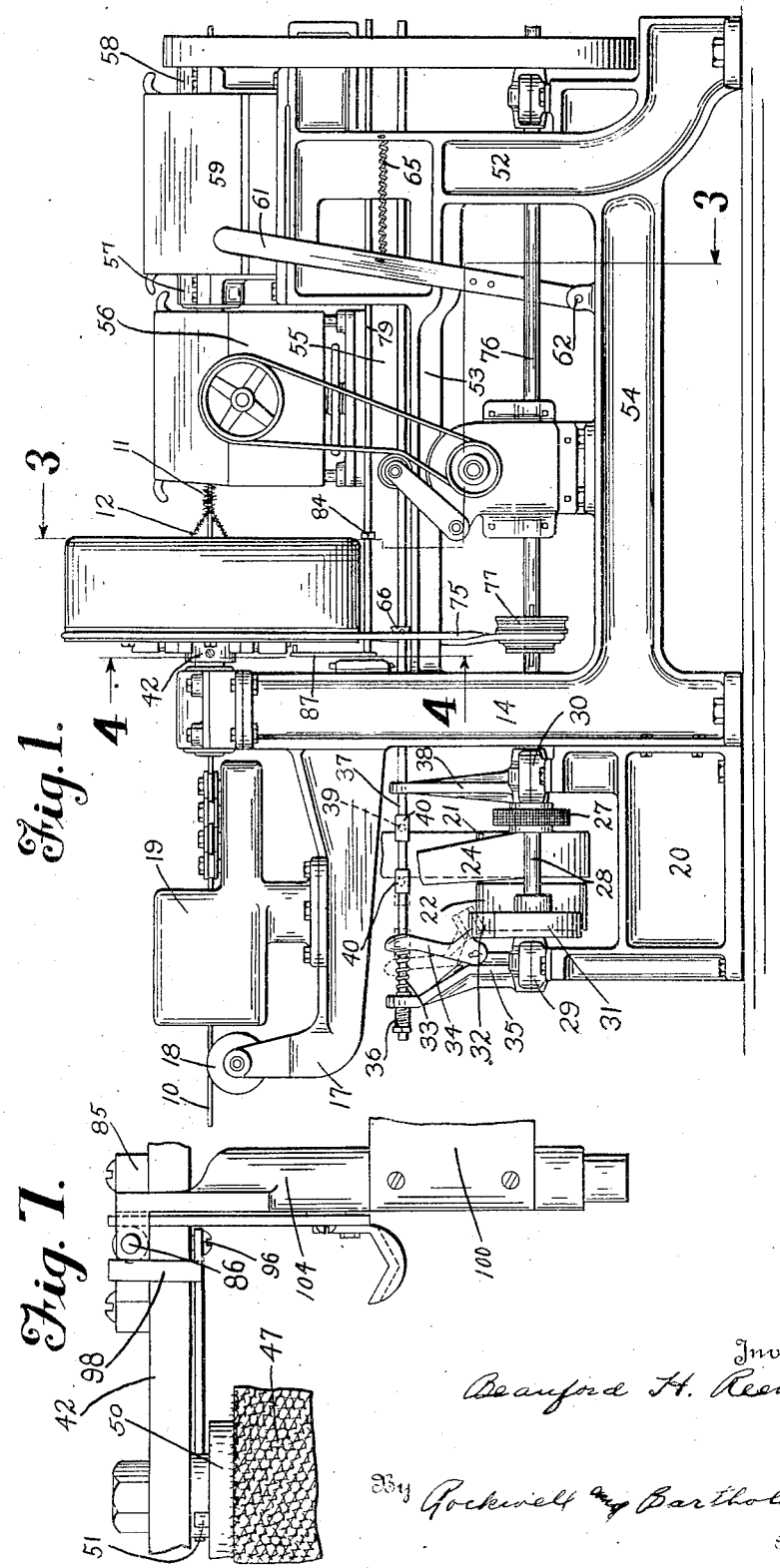
Fig. 1 is a front elevation of a section of a machine, embodying the features of my invention.
Figure 2:
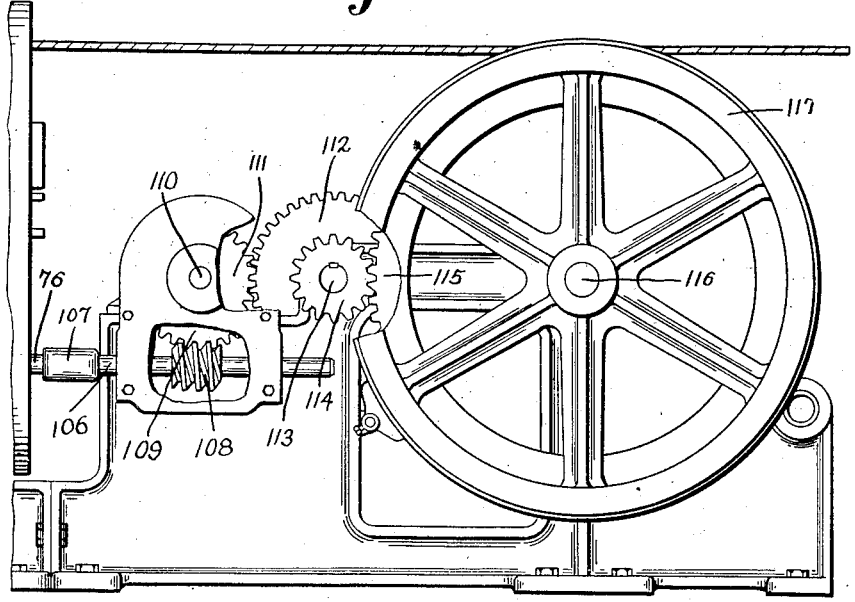
Fig. 2 is a front elevation of another section of the machine.

At the receiving end of the machine, a vertically directed standard 14 is provided, upon the outer face of which is secured a bracket 17, which supports a guide roller 18, and a wire straightening device 19. Below the bracket 17 and also secured to the end face of the standard 14 is a base 20, upon which are mounted fixed and loose pulleys 22 and 21, respectively, which are supported upon a shaft 23, and which are adapted to be driven by a power driven belt 24 from a power source, not shown. A chain sprocket wheel 25 is rotated by the shaft 23, being mounted thereon, and is rotatably connected by the chain 26 to a sprocket wheel 27 secured upon a shaft 28. The shaft 28 is journaled on the base 20 at 29 and 30, and adjacent the bearing 29 has a flat face wheel 31 secured thereto. A strap brake 32 engages the periphery of the wheel 31 under tension of a spring 33, which acts upon an arm 34, secured to the strap brake 32 and pivoted to a bracket 35 upon the base 20. An adjusting screw 36 is provided which may be manipulated in a well known manner to adjust the tension on the spring 33. A belt shifting bar 37 extends from the bracket 35 to another bracket 38, and is provided with transversely extending rods 39, which straddle the belt 24 and engage the same to shift it from one pulley to the other upon movement of the bar 37. Sleeves 40 are provided to connect the rods 39 to the bar 37, one of which is adapted to engage the arm 34 of the brake mechanism when the bar 37 is moved in the direction to shift the belt 24 to the fixed or tight pulley 22, and so release the brake by raising it from engagement with the periphery of the wheel 31, as shown by dotted lines in Fig. 1.

A hollow stud shaft 41 is journaled in the upper end of the standard 14, and a cop or cheese supporting head 42 is keyed or otherwise secured to this shaft. The head 42 is in the form of a disk and is provided with a belt groove 43 formed in the periphery thereof. Openings 44 are provided in the disk shaped head between which are radially disposed spokes or arms 45. A cop or cheese bearing pin 46 extends outwardly substantially at right angles from the face of the head and from each spoke or arm 45. A cop or cheese containing a length of roving 47 wound upon a spool may be slipped longitudinally with respect to the axis of the head upon each of the pins 46, over a sleeve-like holder 49 which is rotatably mounted upon the pin 46, as shown in Fig. 9, and retained thereon by a collar 48 adapted to be secured to the pin 46 by a set screw. The spool or sleeve 60 is adapted to tightly fit the sleeve-like holder 49. The holder 49 is provided with a flange 50 at one end. A pin 51 extends outwardly toward the end face of the head 42 from the flange 50, for a purpose to be hereinafter described. A sheet metal rim or flange 74 extends from the periphery of the head 42 axially over the cheeses of roving and surrounds the same. A belt 75 engages the head 42 in the groove 43 thereof and extends downwardly about a pulley 77, secured to a shaft 76. The shaft 76 is connected to the shaft 28 by any suitable type of coupling (not shown). The pulley 77 is provided with belt grooves of various diameters to permit the rotation of the head 42 at various speeds.

The machine is provided with a rear end standard 52 and longitudinally directed members 53 and 54, which extend between the front standard 14 and the rear standard 52. Upon the upper member 53 and intermediate the standards 14 and 52, a platform 55 is provided upon which is adjustably mounted a compound receiving tank 56. Bearing pedestals 57 and 58 are provided upon the standard 52, in which the trunnions of a rotatable polishing device 59 are respectively journaled.

The belt shifting bar 37 extends from the standard 14 to the standard 52. A shifting bar operating lever 61 is pivoted at one end thereof to a lower supporting member 54 at 62, and extends outwardly and upwardly within reach of the operator of the machine. An arm 63 secured to the lever 61, extends upwardly therefrom and engages the shifting bar 37 at 64, whereby the same may be manipulated to shift the belt 24 from one pulley to the other. One end of a spring 65 is connected to the lever 61, and the other end thereof is connected to the standard 52. The spring 65 operates, due to its tension, upon the lever 61 to urge the bar 37 in a direction whereby the belt 24 will tend to be shifted or retained upon the loose pulley 21. To prevent this action, except when it is desired, a catch 66 is secured to the bar 37 and engages a slidable pawl 67 mounted on the standard 14, when the lever 61 is manipulated to move the bar 37 into a position whereby the belt 24 is upon the tight pulley 22. The release of such engagement places the spring 65 in operation to again shift the belt over upon the loose pulley 21.

The pawl 67 is secured to a slide 68, which is slidably mounted upon a base 69, secured to the standard 14. The slide 68 is guided in its movements by the cooperation of the pawl 67, with an opening 70 in a lug 71, upon the base 69, and by the cooperation of a stud 72 extending upwardly from the slide 68 with an opening in a lug 73, also upon the base 69. A coil spring 78 constantly urges the slide 68 downwardly against the lug 71. A rotatable rod 79 is journaled in the base 69 and extends the entire length of the machine. A camming member 80 is secured to the rod 79, and is disposed within an opening 81 in the slide 68. A flattened surface 82 upon the camming member 80, cooperates with a corresponding surface 83 of the opening 81, whereby rotation of the rod 79 will cause the camming member 80 to raise the slide 68 and thus draw the pawl 67 out of engagement with the catch 66. A handle 84 is secured to the rod 79, whereby the same may be rotated manually by an operator of the machine.

A bracket 85 is mounted upon the head 42 between each of the arms 45, so as to be disposed between the cheeses of roving upon the spindles 46. Each bracket 85 supports a slidable pin 86, which is radially disposed with respect to the axis of the head and which, in its lowermost position, is adapted to move a lever 87 extending upwardly and secured at its lower end to the rod 79. A pin 88 extending from the lever 87, is disposed in the path of the lower end of the pin 86, whereby it is engaged thereby to swing the lever 87, thus rotating the camming member 80 to release the catch 66 from the pawl 67. The pin 86 is retained against outward radial movement due to the centrifugal force caused by the rapid rotation of the head 42, by the engagement of an arm 89 of a bell crank 90, which is pivoted at 91 to the bracket 85, with a collar 92 secured to the pin 86. The other arm 93 of the bell crank 90 has a roving engaging member 94, secured thereto, which, when the machine is in operation, lightly rides upon the strand of roving in such a manner that the arm 89 is retained in position to hold the pin 86 radially inwardly and out of possible engagement with the pin 88 on the lever 87. An interruption in the strand of roving, due to breakage, or the like, will immediately release the pin 86 from the action of the arm 89, and the lever 87 will be engaged to release the catch 66 from the pawl 67, whereby the belt shifting bar 37 will be moved by the spring 65 to shift the belt 24 on to the loose pulley 21, and causing the operation of the brake 32 whereby the operation of the machine will stop.

It may be desired to operate the machine with one or more cheeses of roving removed from the head 42. Under such circumstances, the pin 86 normally controlled by the omitted cheeses will not be retained in an operative position by the strand thereof, through the agency of the crank arm 93, and the operation of the machine would not be permitted. Means to retain pins 86 under the above conditions is provided, and comprises a bell crank 95, pivoted at 96 to the bracket 85. An arm 97 extends substantially radially with respect to the axis of the head, and is provided with an end portion 98, which is adapted to move to a position over the outer end of the pin 86, when the crank 95 is rotated in one direction, and to release the pin 86 from such engagement when the crank is moved into another position. The bell crank 95 is manually moved into pin engaging position when the machine is set up. Another arm 99 of the bell crank 95, extends toward the spindle 46 that holds the cheese of roving, with its end lying in the path of the pin 51, extending from the flange 50 of the holder 49, when the latter is upon the spindle 46. The arm 99, therefore, insures that the arm 97 will be moved to disengage the portion 98 thereof from the pin 86, when a cheese of roving is placed and rotated upon a spindle 46, previously empty. The pin 51, during the first rotation of the corresponding cheese, engages the arm 99 to swing the crank 95 into releasing position with respect to the pin 86.

A brake band 100 is swingably mounted upon a stud 101, secured to the bracket 85, and is urged into engagement with the periphery of an adjacent cheese of roving by a spring 102. The spring 102 is coiled about the stud 101, with one end thereof secured thereto, the other end being secured to a member 103 to which the brake band 100 is secured. The stud 101 is adjustably journaled in an extending portion 104 of the bracket 85, being secured therein by means of a set screw 105. By loosening the set screw 105, the stud 101 may be rotated to adjust the tension of the spring 102, so as to provide a sufficient amount of pressure of the brake band 100, upon the cheese to prevent the same from spinning or from overrunning when the machine is in operation, thereby keeping the strand of roving taut.

The mechanism selected to illustrate the conductor feeding means above mentioned, comprises, in this instance, a windlass section which may be operably connected to the shaft 76 by coupling the same to a shaft 106, by means of a coupling member 107. Secured upon the shaft 106 is a worm 108 in mesh with a worm wheel 109, secured upon a shaft 110, upon which is a removable gear 111 of a set of change gears 111, and 112. The gear 112 is removably secured to a shaft 113, upon which is secured a pinion 114, which meshes with a gear 115, rotatably mounted upon a stud shaft 116. The gear 115 is bolted to a windlass drum 117 which is rotatably mounted upon the stud shaft 116. By a proper combination of change gears 111 and 112, the speed of the drum 117 may be adjusted to vary the speed at which the conductor 10 is fed or drawn through the machine preceding this windlass.

The conductor 10 received from any suitable source of supply, is fed through the straightening device 19, and is then passed through a hollow shaft 41 and axially through the head 42. After passing through the head 42, the conductor is fed through the compound applying tank 56, wherein suitable compound is applied to the insulation covered conductor. The conductor is then passed through the wiping and polishing device 59 and on to and about the windlass drum 117.

After the disposition of the conductor as above outlined, the required number of cheeses of roving 47 are mounted upon the pins 46 in the head 42, and the strands of roving 12 from each cheese or cop are threaded beneath an adjacent roving engaging member 94. The machine is now provided with power by shifting the belt 24 from the loose pulley 21 to the tight pulley 22 by the proper manipulation of the shifting bar 37, by the operating lever 61. The movement of the shifting bar 37 causes the sleeves 40 to engage the arm 34 of the brake 32 to move it into the dotted position shown in Fig. 1, where it is in inoperative position and under tension of the spring 33, and released from engagement with the wheel 31. The arm 34 is retained in brake releasing position due to the bar 37 being retained in power applying position by means of the cooperation and engagement of the pawl 67 with the catch 66.

The strands of roving 12 are now started over the conductor, and the rotation of the head about the same winds the roving thereon. The windlass being in operation, immediately starts to feed or draw the conductor longitudinally of the machine, and a layer of insulation 11 is applied to the conductor 10 in long helical windings.

When the cops or cheeses 47 of roving are in place, and each is rotated upon the pin 46, the pin 51 and the flange 50 of the holder 49 will insure that the arm 97 is swung into proper position to release the pin 86, permitting it to move radially inward so that the lower end thereof will clear the pin 88 in lever 87. The strand of roving 12, when engaged by the member 94 and drawn taut, will rock the bell crank 90 and cause the arm 89 to draw the pin 86 inwardly into its inoperative position and retain it in such position against the centrifugal force acting thereon to urge it outwardly into engagement with pin 88.

Should the strand of roving 12 become slack and not have sufficient tautness to retain the pin 86 in inoperative position, the lever 87 will be rocked by the engagement of pin 86 with pin 88, and the rod 79 will also be rocked. The rocking of rod 79 operates the cam 80 to raise the pawl 67 and release the catch 66. Release of the catch 66, permits the bar 37 to shift the belt 24 on to the loose pulley 21, and permits the application of the brake 32, whereby the operation of the machine is stopped. The same action of the parts will take place should the strand of roving 12 break, and also when the ends of the strand upon the cop or cheese 47 is reached.

The provision of the bell crank 95 with its pin engaging part 98 and arm 99, prevents the operation of the machine when no cop or cheese 47 is in place, unless the operator sets the part 98 in pin retaining position. This part, after being so set, will be automatically operated to permit the free action of pin 86 as soon as the corresponding cheese 47 is mounted in place and rotated, at the most, one revolution.

While I have shown and described a preferred embodiment of my invention, it will be understood that the same is not to be limited thereto in all of its details, as many modifications and variations are possible which will lie within the spirit of the invention and scope of the appended claims.

What I claim is:

1. In a machine of the type described, a rotatable head, means to rotate said head, means to connect and disconnect said rotating means to a source of power, means to retain said connecting means in power connecting position, means mounted on said head and adapted to release said retaining means, means on said head to rotatably receive and support a cop of roving, and means to prevent the operation of said releasing means, when said cop supporting means is empty.

2. In a machine of the type described, a rotatable head, means to rotate said head, means to connect and disconnect said rotating means to a source of power, means to retain said connecting means in power connecting position, means mounted on said head and adapted to release said retaining means, and means to prevent the operation of said last named means, means associated with said head to rotatably receive a sleevelike roving holder having a flange at one end thereof, and means on said flange adapted to engage said operation preventing means to move the same into inoperative position.

3. In a machine of the type described, a rotatable head, means to rotate said head, means to connect and disconnect said rotating means to a source of power, means to retain said connecting means in power connecting position, means mounted on said head and adapted to release said retaining means, and means to prevent the operation of said last named means, means on said head to rotatably receive a roving holder, and means on said holder adapted to engage said operation preventing means to move the same into an inoperative position.

4. In an insulation forming machine, rotatable means having a cop of insulating material in strand form rotatably mounted thereon, driving means for said rotatable means, means to disconnect said driving means from said rotatable means, means to rotate said cop to unwind the strand of material therefrom, centrifugally operable means operably connected to said driving means, disconnecting means to operate the same, said last named means engaging the strand of material as it is unwound from said cop, and being controlled thereby in position to retain said disconnecting means inoperable and to permit the operation thereof.

5. In a machine for covering a conductor or the like with material in the form of strands, a rotatable head having a stud extending axially from the face thereof, a flanged sleeve containing a cop of insulating material rotatably mounted on said stud with the flange thereof spaced from and adjacent said head, means to rotate said head, control means for said head rotating means having a part disposed between said flange and said head, and means on said flange adapted to engage said part during a rotation of said sleeve on said stud to permit the operation of said control means.

6. In a machine for covering a conductor or the like with material in the form of strands, a rotatable head having a stud extending axially from the face thereof, a flanged sleeve containing a cop of insulating material rotatably mounted on said stud with the flange thereof spaced from and adjacent said head, means to rotate said head, control means for said head rotating means and having a part disposed between said flange and said head, and means on said flange adapted to engage said part during a rotation of said sleeve on said stud to cause said part to permit the automatic operation of said control means to stop said head rotating means.

7. In a machine of the type described, a rotatable head, means to rotate said head, a plurality of receivers for cops of strand material mounted on said head, control means for said rotating means disposed adjacent each cop receiver and having a part engaged by the strand being taken therefrom, said control means being adapted to cause said rotating means to stop when the continuity of the strand is interrupted, and releasable means to prevent the operation of each control means, said last named means being releasable by a cop placed upon said cop receiver to permit operation of the control means.

8. In a machine of the type described, a rotatable head, means to rotate said head, a plurality of receivers for cops of strand material mounted on said head, control means for said rotating means disposed adjacent each cop receiver and having a part engaged by the strand being taken therefrom, said control means being adapted to cause said rotating means to stop when the continuity of the strand is interrupted, and means to prevent the operation of each of said control means when the cop receiver associated therewith is empty.

9. In a machine of the type described, a rotatable head, means to rotate said head, a plurality of receivers for cops of strand material mounted upon said head, control means for said rotating means disposed adjacent each cop receiver and having a part engaged by the strand being taken therefrom, said control means being adapted to cause said rotating means to stop when the continuity of the strand is interrupted, and means to prevent the operation of each of said control means when the cop receiver associated therewith is empty, and means associated with each cop of material to release said control means from the action of said last named means to permit the operation of said control means after the cop receiver associated therewith has received a cop of material.

10. In a machine of the type described, a head rotatable on a horizontally disposed axis, and having a plurality of cops of strand material rotatably mounted thereon, swingable means mounted upon said head adjacent each cop and adapted to engage the strand of material as it unwinds from said cop, a member mounted upon said head adjacent each of said swingable means and being radially slidable with respect to said head, said member being retained against movement by the engagement of said swingable means therewith and with the strand of material, means to rotate said head, a source of power, a rockable member disposed in the path of said slidable member to be engaged thereby when the latter is released for movement by an interruption in the continuity of the strand of material, interconnecting means between said head rotating means and said source of power, and means operable by said rockable member to operate said interconnecting means to disconnect said head rotating means from said source of power.

11. In a machine of the type described, a head rotatable on a horizontally disposed axis and having a plurality of cops of strand material rotatably mounted thereon, swingable means mounted upon said head adjacent each cop and adapted to engage the strand of material as it unwinds from said cop, a member mounted upon said head adjacent each of said swingable means and being radially slidable with respect to said head, said member being retained against movement by the engagement of said swingable means therewith and with the strand of material, means to rotate said head, a source of power, a rockable member disposed in the path of said slidable member to be engaged thereby when the latter is released for movement by an interruption in the continuity of the strand of material, interconnecting means between said head rotating means and said source of power, and means operable by said rockable member to operate said interconnecting means to disconnect said head rotating means from said source of power, and means associated with each of said slidable members and adapted to be moved into a position to prevent the operative movement of said slidable member.

12. In a machine of the type described, a head rotatable on a horizontally disposed axis and having a plurality of cops of strand material rotatably mounted thereon, swingable means mounted upon said head adjacent each cop and adapted to engage the strand of material as it unwinds from said cop, a member mounted upon said head adjacent each of said swingable means and being radially slidable with respect to said head, said member being retained against movement by the engagement of said swingable means therewith and with the strand of material, means to rotate said head, a source of power, a rockable member disposed in the path of said slidable member to be engaged thereby when the latter is released for movement by an interruption in the continuity of the strand of material, interconnecting means between said head rotating means and said source of power, and means operable by said rockable member to operate said interconnecting means to disconnect said head rotating means from said source of power, and means associated with each of said slidable members and adapted to be moved into a position to prevent the operative movement of said slidable member, and means associated with each of said cops and adapted to engage said slidable member operation preventing means and move it into inoperative position to permit operative movement of said slidable member.

13. In a machine of the type described, a horizontally disposed rotatable head having a plurality of cops of strand material rotatably mounted upon a face thereof, a bell crank pivoted at the jointure on the arms thereof to said head adjacent each cop thereon and having one of its arm adapted to be engaged with the strand of material as it is unwound, a member mounted upon said head for movement toward the periphery of said head during its rotation by the centrifugal force developed thereby, the other arm of said bell crank engaging said member and retaining it against such movement while the first mentioned arm is in engagement with the strand, and means disposed in the path of said centrifugally movable member and operable thereby to stop the rotation of said head when the arm of said bell crank engaging the strand of material becomes disengaged therefrom.

14. In a machine of the type described, a horizontally disposed rotatable head having a plurality of cops of strand material rotatably mounted thereon, a bell crank pivoted to said head adjacent each cop and at the jointure of the arms thereof, one of the arms of said bell crank being adapted to engage the strand of material as it is unwound from the adjacent cop, a member mounted upon said head for radial sliding movements relatively thereto, the other arm of said bell crank engaging said member and retaining it against the aforesaid movements while the first mentioned arm is in engagement with the strand, and means disposed in the path of said member and operable thereby to stop the rotation of said head when the arm of said bell crank engaging the strand of material becomes disengaged therefrom.

15. In a machine wherein a strand of material is wound upon a wire-like member, a rotatable head, means to rotate said head, control means for said head rotating means, said control means being adapted to stop said head rotating means when the continuity of the strand is interrupted, a receiver for a cop of strand material mounted on said head, and means operably associated with a cop of material upon said receiver to maintain said control means in an inoperative position.

16. In a machine wherein a strand of material is wound upon a wire-like member, a rotatable head, means to rotate said head, control means for said head rotating means, said control means being adapted to stop said head rotating means when the continuity of the strand is interrupted, a receiver adapted to rotatably support a cop of strand material and mounted on said head, releasable means to retain said control means in an inoperative position, said means being releasable by the rotation of a cop of material upon said receiver to permit operation of said control means.

17. In a winding machine, a rotatable head, means to rotate said head, a receiver on said head adapted to rotatably receive a cop of strand material, control means on said head for said head rotating means, means adapted to engage the strand of material as it is being wound upon the article and to actuate said control means when the continuity of the strand is interrupted, releasable means to retain said control means in an inoperative position, said last named means being maintained inoperative by the rotation of the cop on said receiver.

18. In a machine wherein a strand of material is wound upon a wire-like member, a rotatable head, means to rotate said head, control means for stopping the rotation of said head, means to receive a supply of strand material, releasable means to prevent the operation of said control means when a supply of strand material is omitted from said receiving means, and means to release said releasable means to permit operation of said control means when a supply of material is received by said receiving means.

19. In a machine wherein a strand of material is wound upon a wire-like member, a rotatable head adapted to receive a supply of strand material, means to rotate said head, control means for said head rotating means, said control means being associated with a strand of the material while it is being wound upon the wire-like member and being adapted to stop said head rotating means when the continuity of the strand is interrupted, releasable means to retain said control means in inoperative position with respect to stopping said rotating means when the supply of material is omitted from said head, and means to release said releasable means to permit operation of said control means when a supply of material is received on said head.

In witness whereof, I have hereunto set my hand this 8th day of November, 1927.

BEAUFORD H. REEVES.